Figure 1:
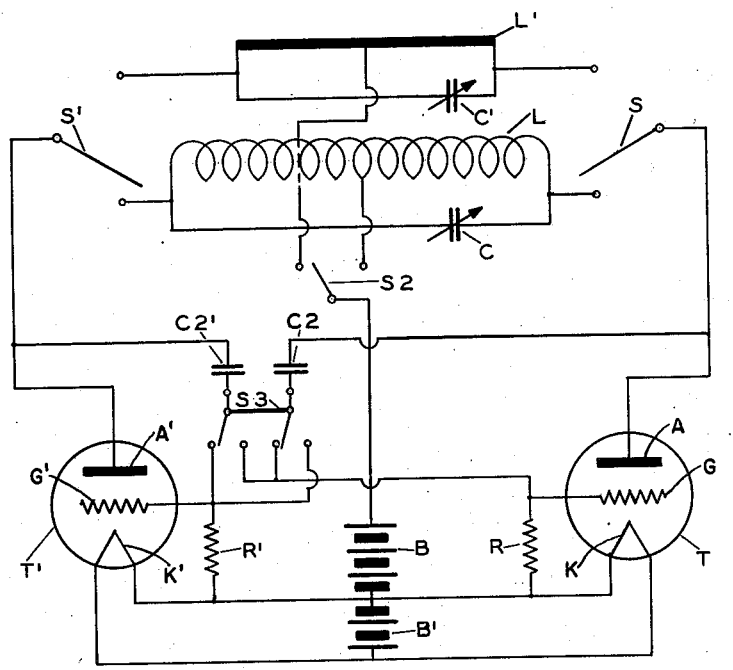

Dec. 5, 1950    S. R. MONTCALM    2,533,032
ELECTRICAL ALTERNATING CURRENT GENERATION

Filed June 1, 1944    4 Sheets-Sheet 1

SURRIUS RECTOR MONTCALM
INVENTOR

BY

ATTORNEY

Dec. 5, 1950  S. R. MONTCALM  2,533,032
ELECTRICAL ALTERNATING CURRENT GENERATION
Filed June 1, 1944  4 Sheets-Sheet 2

SURRIUS RECTOR MONTCALM
INVENTOR

BY

ATTORNEY

Dec. 5, 1950  S. R. MONTCALM  2,533,032
ELECTRICAL ALTERNATING CURRENT GENERATION
Filed June 1, 1944  4 Sheets-Sheet 3

SURRIUS RECTOR MONTCALM
INVENTOR

BY

ATTORNEY

Dec. 5, 1950    S. R. MONTCALM    2,533,032
ELECTRICAL ALTERNATING CURRENT GENERATION
Filed June 1, 1944    4 Sheets-Sheet 4

SURRIUS RECTOR MONTCALM
INVENTOR

BY

ATTORNEY

Patented Dec. 5, 1950

2,533,032

UNITED STATES PATENT OFFICE 2,533,032

ELECTRICAL ALTERNATING CURRENT GENERATION

Surrius Rector Montcalm, Boonton, N. J., assignor, by mesne assignments, to Ferris Instrument Laboratories, Boonton, N. J., a corporation of New Jersey Application June 1, 1944, Serial No. 538,221

40 Claims. (Cl. 250—36)

My present invention broadly relates to the generation of electrical alternating currents, and is a continuation in part of an application I filed in the U. S. Patent Office on April 1, 1942, given Serial No. 437,117 now abandoned.

For the generation of the electrical alternating currents involved, my present invention permits of the use of certain forms of standard thermionic tubes associated with special circuits and elements thereof so selected and arranged that the generation of electrical alternating currents ranging in frequencies of alternations from audible frequencies without interruption into ultra high frequencies of hundreds of megacycles without changing the tubes in use is accomplished simply by easy to make changes in the special circuits and elements involved.

I am acutely aware of the fact that standard thermionic tubes of certain forms associated with certain circuits and elements thereof have long been used for the generation of electrical alternating currents, but I have also found that the prior practices for such generation become highly inefficient, unstable and unreliable as increased frequency of operation is pursued to become totally inoperative for generation as further increase of operation at higher frequencies is pursued, with the border line between generation and non-generation depending upon disturbingly elusive, difficult to analyze and manage, variations in the characteristics of the thermionic tubes, circuits and circuit elements involved.

As an example of a particular object of my present invention, the arrival of the present war soon gave birth to pressing needs for so-called Standard Signal Generators exceeding by far in ranges of frequencies of operation everything in this respect contemplated in the signal generator Patents Nos. 1,793,601; 1,877,287; 2,037,160; 2,131,101 and 2,265,637 issued to Malcolm Ferris at various times, even though the last one of the said patents clearly contemplated even the then dormant from a commercial operations point of view electrical alternating currents generated at frequencies of the order of 150 megacycles; and thus gave rise to the particular object of evolving out of what was then on hand for the Standard Signal Generators commercially acceptable means for generating electrical alternating currents at and far along on both sides of 150 megacycles with the time element the most critical of all of the elements necessarily involved. That due to effectively evolving my present invention the particular and pressing object has been successfully met and mastered is attested to by the fact that it has been successfully worked into a Standard Signal Generator having a successful coverage of from 20 megacycles to 250 megacycles without any change whatever being brought to bear in the case of a duplex thermionic tube, or equivalent pair of thermionic tubes, selected for the particular installation.

From the above set forth circumstances, it becomes clearly apparent that the principal object of my present invention is the one of not having to depart from thermionic tubes having standardized construction in order to effectively generate with the aid thereof electrical alternating currents stable and otherwise dependable in character at and far along on both sides of a region of frequencies in which the generation activities involved tend to become unstable and/or unreliable in the absence of the corrective measure for which my present invention provides.

Figure 2:
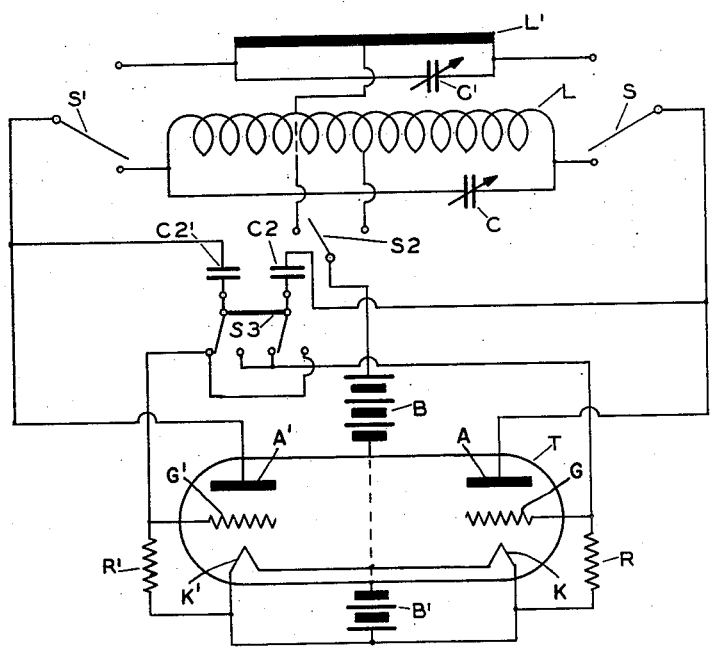

As aids to fully describing my present invention, I relay on the eight figures of the accompanying drawing, first briefly identifying them as follows:

Figs. 1 and 2 diagrammatically represent generic embodiments of my present invention in which the embodiment of Fig. 2 only differs from that of Fig. 1 in showing the substitution of a duplex type of thermionic tube in lieu of two separate thermionic tubes.

Figure 3:
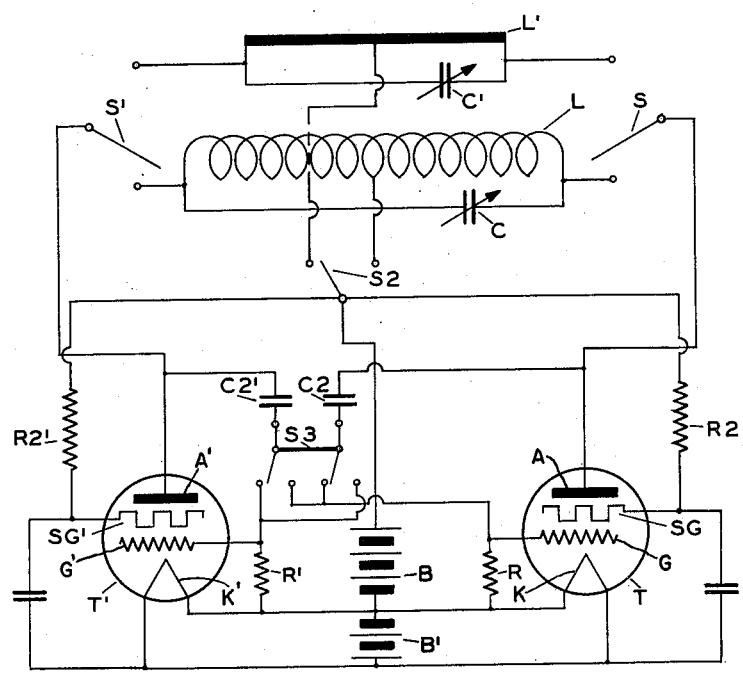
Figure 4:
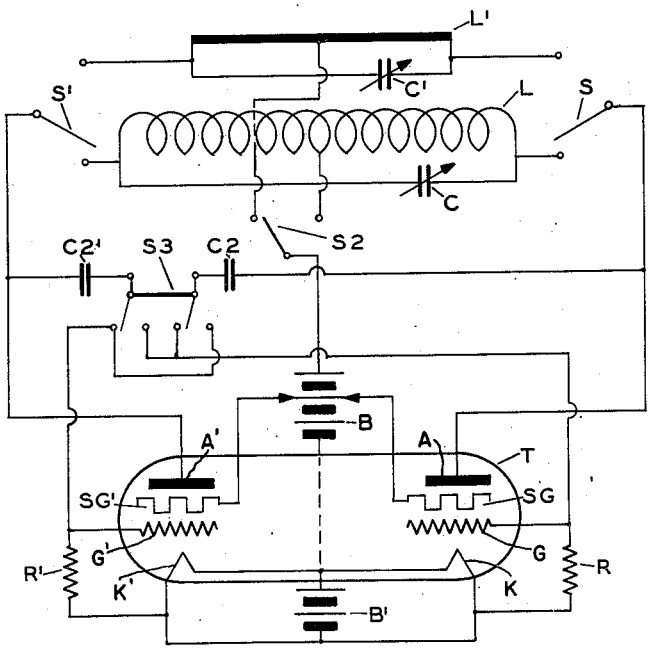

Figs. 3 and 4 diagrammatically represent the embodiments of Figs. 1 and 2, respectively, with the exception that they show an additional electrode in the thermionic tubes involved.

Figure 5:
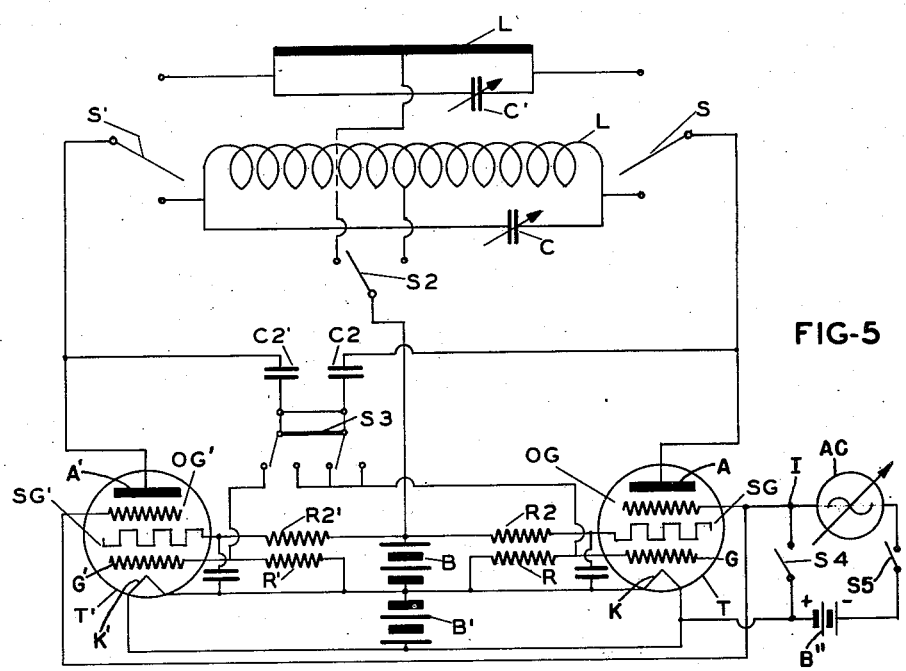
Figure 6:
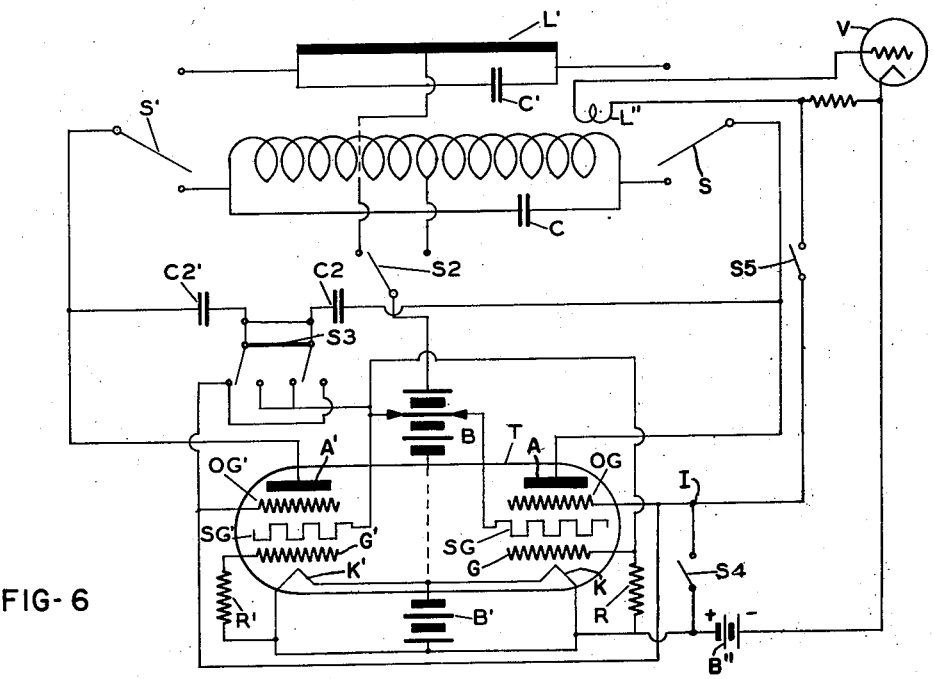

Figs. 5 and 6 diagrammatically represent the embodiments of Figs. 1 and 2, respectively, with the exceptions that they show two additional electrodes in the thermionic tubes involved plus leads originating externally of the tubes involved to each one of the second additional electrodes in which leads special devices that will hereinafter be described are included.

Figure 7:
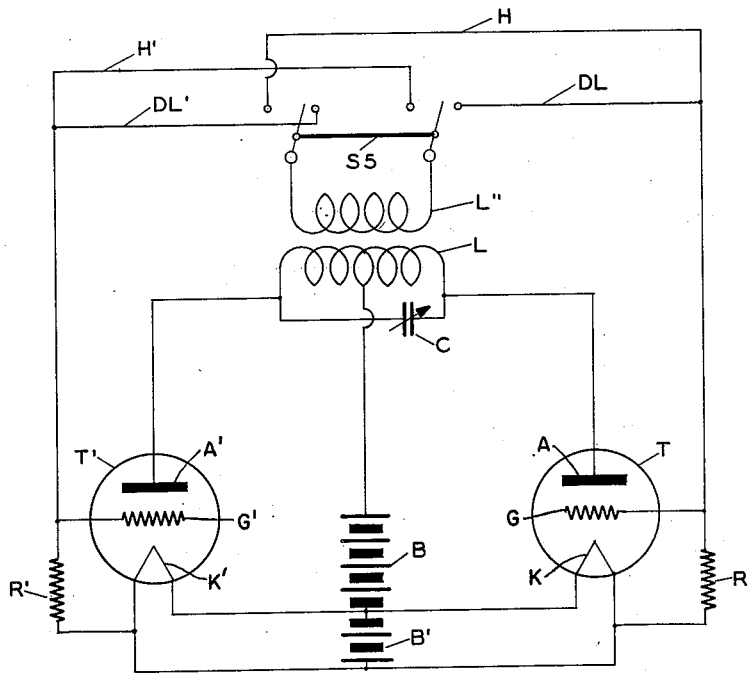

Fig. 7 diagrammatically represents the embodiment of Fig. 1 with the exception of circuit modifications.

Figure 8:
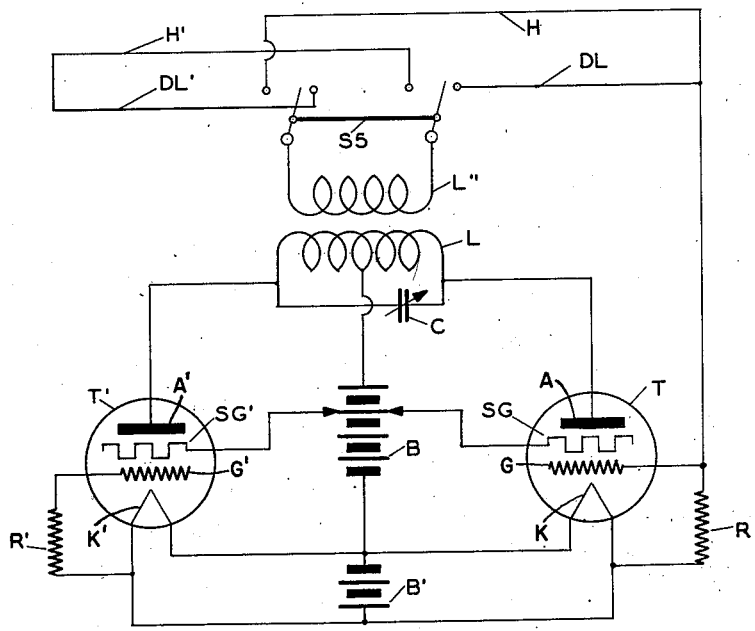

Fig. 8 diagrammatically represents the embodiment of Fig. 3 with the exception of circuit modifications.

Like reference symbols of the respective figures of the drawings represent like or closely related parts therein.

Referring to Fig. 1, it shows in the indicated thermionic tubes T and T', each containing a conventionally indicated cathode K and K' heated for electron emission by battery B', an indicated anode A and A' maintained at a positive potential by battery B and an interposed therebetween grid electrode G and G' each maintained at a negative potential by the well known action of the respective grid-leak resistances R and R', two active electron paths which, in keeping with the requirements of my present invention, are chosen to be and to remain as near as possible physical and functional identities.

The anode of each of the respective tubes is shown to be conductively connected to a separate respective switching arrangement symbolized as S and S', respectively; and, as indicated, connection of the respective anodes with the respective extremities of an indicated inductance L and variable capacitance C circuit are obtainable through proper positioning of the indicated moveable arms of the respective switching arrangements; which action, as further indicated, will result in the respective anodes being brought into conductive connections with the positive terminal of the battery B through a mid point of inductance L if switch S2 is in contact or is placed in contact with the indicated right hand contact point of the connection involved.

With the embodiment of Fig. 1 connected up and energized to the foregoing extent, with the exception of the very small degrees of capacitances existing between the respective anodes and grids of the respective tubes, there is no effective feed-back coupling between the respective cathode-grid and cathode-anode circuits, to say nothing of a properly phased feed-back coupling, without which it is elementary that such arrangement is totally lacking in power to act as a generator of electrical alternating currents irrespective of the electrical natural period of the connected in circuit LC, and that what little electrical couplings therebetween that do exist due to the said interelectrodal capacitances alternately act in opposing phases to those actually required, and, therefore, automatically oppose and make impossible the attainment of the specific feed-back coupling functioning on which the generation of electrical alternating currents absolutely depends.

Quite sometime ago it was discovered that if a suitable degree of artificial capacitance is inserted between the anode of each of the tubes and the grid of the respective companion tube sufficient to overcome the respective opposing actions of the inherent interelectrodal capacitances, satisfactory generation of electrical alternating currents at all of the frequencies occupying the attention of the art was attained, the reason therefor apparently being that in addition to being able to attain thereby much higher degrees of overall electrical coupling, the reversed feed-backs brought about cancelled out the opposing feed-backs with a balance of overall feed-backs of properly timed phases. In other words, it seems that when generation of electrical alternating currents at the frequency fixed by the electrical natural period of the circuit LC actually goes on, the reason therefor is that the potential at any point of the inductance L other than the actual electrical midpoint alternately swings positive and negative to alternately swing one anode more positive while swinging the other anode less positive than fixed by the direct positive potential of the battery B, with the result that a capacitance connected between the anode of tube T and the grid of tube T', for example, will consequently act, when the anode of tube T swings to less positive, to cause the grid of tube T' to swing less negative, and thereby cause the current flow through the anode of tube T' and the circuit LC to increase, and vice versa in the respective tubes as actual generation goes on; from which it would ordinarily appear to be obvious that if this swinging should be reversed, actual generation must cease.

Through the indicated artificial capacitances C2 and C2' and the indicated switching arrangement S3 plus the four contact points associated therewith and connections thereto, the above described swinging of potential actions, or the reverse of them, can be selectively brought to bear by obvious proper use of the said switching arrangement, and by reverse it is meant that the artificial capacitance is connected from anode to grid of the same tube in the cases of both tubes.

With this addition to the embodiment of Fig. 1, but with proper changes in the inductance and capacitance values in the case of circuit LC, I have found that with the same pair of tubes in action, dependable generation of electrical alternating currents ranging from audible frequencies to ultra high frequencies of the order of 250 megacycles is decidedly easy to obtain and maintain because there appears to be a substantial overlapping in the frequency region wherein dependable generation can be had with the switching arrangement S3 in either one of the two provided for positions which continues to be obtainable and maintainable far along on the ultra high frequency side of this region by adhering to the "reverse" form of operation. In other words, I have found that before the ordinary form of operation becomes too unstable to be of practical value as increase of frequency of operation is pursued, the "reverse" form of operation has become adequately stable to satisfactorily take over.

From a strict technological point of view, I am not certain as to just what is involved in the way of relative actions that are responsible for the phenomena behind the success of operation at ultra high frequencies found in using the "reverse" form of operation; however, it seems that to a large extent they must be based on time factors. Irrespective of the laws of nature involved, the fact that such enormous ranges of operations can be covered with only a single simple circuit fixing the frequencies at which standard thermionic tubes generate electrical alternating currents without interfering actions on the parts of the two grid-cathode circuits is indeed surprising from the point of view of prior sought after results.

Fig. 1 further brings out that through simple switching arrangements (S and S') a circuit having a rod or bar form of inductance L' can readily replace circuit LC having a coil form of inductance L, which is in accordance with practical considerations because as the generation of increasing-in-frequency ultra high frequency electrical alternating currents is pursued, the coil type of inductance becomes more and more undesirable and even has to be abandoned and replaced by the rod or bar form of inductance which takes on very small physical proportions when it comes to dealing with operations at 200 megacycles and above.

As an example of what this practice can amount to, in covering with margins to spare at both ends operations from 20 megacycles to 250 megacycles, I have lodged six separate LC circuits with overlapping electrical natural periods longitudinally on the inner wall of a rotatable cylinder with contact terminals so laid out that on rotation of the said cylinder any one of the six units could become its part of the embodiment of Fig. 1, and at the same time automatically make the respective connections disclosed in connection with switching arrangements S2 and S3, all from panel installed control means. Thus, an operator of such a generator has under his immediate control the generation of an electrical alternating current of any frequency in a range of nothing less than 20 megacycles to 250 megacycles.

Fig. 2, as before disclosed, represents an embodiment of my present invention substantially the equivalent of the embodiment of Fig. 1 with the exception that a standard duplex type of thermionic tube takes the place of the two thermionic tubes of Fig. 1. This change provides for using but one tube socket in place of two in addition to resulting in a saving of space which becomes extremely important when such a generator must be lodged in a housing otherwise crowded with many other things such as happens in the cases of designing and building the various current models of Standard Signal Generators.

Fig. 3, as before disclosed, represents an embodiment of my present invention substantially the equivalent of the embodiment of Fig. 1 with the exception that standard 4-electrode thermionic tubes take the places of the 3-electrode tubes of Fig. 1. In this case, the fourth or additional electrode SG and SG', is of the so-called screen grid type, and, being interposed between the anode and grid, plus being maintained at a positive potential by being connected to a positive point of potential of battery B less than the positive potential of the anode due to voltage reducing resistances R2 and R2', it serves to substantially eliminate the inherent capacitance between anode and grid in the case of the 3-electrode tubes of Fig. 1, which makes the necessary feed-back action substantially independent of whatever defects that might occur in standard tube manufacture as well as changes in placements of the electrodes that are likely to happen under the normal high temperature conditions that continue without abatement during the usual long life built into standard 3-electrode tubes. In other words, in the case of the particular embodiment of Fig. 3, no occasion is likely to arise for later adjusting the values of the artificial capacitances C2 and C2' to make up for changes in the paralleling inherent interelectrodal capacitances of the tubes inherent to the Fig. 1 embodiment.

A further advantage derivable from the screen-grid tube embodiment of Fig. 3 is that it can better be depended upon for maintained stability where a higher power output is sought.

The advantage of the duplex type of tube embodiment of Fig. 4 over the Fig. 3 embodiment, the embodiments being otherwise substantially equivalent, is the same as that set forth with respect to Fig. 2 over Fig. 1.

Fig. 5, as before disclosed, differs from the embodiment of Fig. 1 by reason of resorting to standard thermionic tubes having added thereto two electrodes, namely, SG and SG', which are subject to the same comments as those set forth in connection with the SG and SG' screen-grid electrodes of the tubes involved in the description of Fig. 3, plus the indicated control type of grids OG and OG' shown located adjacent to the respective anodes. These grids are indicated as having leads thereto which conductively come together outside of their respective tubes to form a single lead or terminal I having connections to indicated switches S4 and S5.

By closing switch S4 while keeping switch S5 open, the tubes become equivalents of so-called "Power Amplifier Pentode" tubes such as the RCA 6F6 sold by the RCA Manufacturing Co., Inc., because it results in maintaining the potential of the grids involved at the same potential as their corresponding cathodes, which type of tube, because of its higher power characteristics, makes it possible to generate higher powered electrical alternating currents with standard tubes properly embodied in my present invention.

In many cases, such as in radio telephony and television, the carrier electrical alternating currents must be modulated to produce proper signal bearing currents, which modulation can be done with unusual efficiency by applying the particular signal potentials from an indicated source AC to terminal I while switch S4 remains open, under which modulation conditions it would be desirable to maintain the respective grids so sufficiently negative by indicated battery B'' that they would not draw grid current on the positive half cycles of the generated and modulated electrical alternating currents to thereby preserve the fidelity of operation.

In other cases, such as in Standard Signal Generators, it often becomes desirable to control either automatically or at will the output volume of the electrical alternating currents, which, in the case of the Fig. 5 embodiment can be done by controlling the degree of negative potential impressed on the outer grids OG and OG' by either applying a manually controlled source of negative potential to the input terminal I or doing the same through developing the variable negative potential involved by rectifying a portion of the generated output, whereby, as the volume of generation increases the negative potential derived from rectification will automatically increase to thereby lower the volume of generation, and vice versa in case the volume of generation tends to fall off, the means for which are shown more in detail by Fig. 6.

Should it be desired to obtain ultra high frequency electrical alternating currents of frequencies higher than anything that can be obtained by the "reverse" method of my present invention, it can be accomplished by applying to terminal I the alternating potentials of an independently generated electrical alternating current as from the indicated source AC. For example, if the generation of the embodiment of Fig. 5 is limited to electrical alternating currents of a peak frequency of 300 megacycles, and while so generating, terminal I is subjected to alternating potentials of a frequency of 200 megacycles, it is obvious that with a selecting circuit having an electrical natural period of 500 megacycles coupled to circuit LC or L'C' there will be selected out electrical alternating currents equaling the sum of 300 and 200 megacycles in frequency, or 500 megacycles in frequency.

Another way of making the use of the embodiment of Fig. 5 important is that even if it is confined to the "reverse" method of operation, and it is desired to cover frequencies so low that the "reverse" method fails to produce the same, all of the production at the desired lower frequencies can be had, for example, by holding the electrical natural period of circuit L'C' to 200 megacycles while applying alternating potentials of any frequency desired to terminal I, and selecting out of circuit L'C' electrical alternating currents of a frequency equal to the difference between 200 megacycles and the X megacycles applied, which, for example, if X equals 180 megacycles, will necessarily be 20 megacycle electrical alternating current, and so on to where the frequency becomes high enough for the "reverse" method of generation alone to take over. It should be noted that if it is compulsory that the lowest frequency be of the order of 20 megacycles, and it is not feasible to bring to bear on terminal I alternating potentials of 180 megacycles, one readily available answer would be the setting of the circuit L'C' at a more logical lower electrical natural period as long as the difference involved seems to so require. Thus, from the facts set forth, it follows that I have found more than one way for making available electrical alternating currents ranging in frequency from audibility to ultra high frequencies measured in hundreds of megacycles without shifting tubes.

Fig. 6, with the exception of indicating that it makes possible certain savings in relying upon a duplex type of tube and showing means for automatic volume control, is, in its embodiment, otherwise substantially the equivalent of the embodiment of Fig. 5, and, therefore, fully fits into the description of Fig. 5 as to accomplishments. As to the means for automatic volume control, as usual the alternating current absorbed by inductance L'' is rectified by a usual vacuum tube or other rectifier V to develop unidirectional potentials in resistance R3 for addition to the unidirectional potential of battery B''. Thus, if the volume of energy in inductance L tends to increase, the resulting increase in negative potential applied to grids CG and CG' will automatically act to restore the volume of energy to the desired normal amount, all as is well known in the art.

Fig. 7, as before disclosed, with the exception of certain modifications in the circuits and their elements involved, is, in its embodiment, substantially the equivalent of the embodiment of Fig. 1. It teaches that if it is not feasible for design or other reasons to feed the control grids G and G' the properly timed potentials to cause and sustain the generation of electrical alternating currents through capacitances arranged in accordance with the teaching of Fig. 1, there is at least one alternative in a properly comprehended grasping of what happens under certain conditions of manipulating the embodiment of Fig. 1 in which no artificial anode-to-grid capacitances are used. Instead, inductance L'' is coupled to inductance L of the frequency control circuit LC, and is terminated in a double throw switch S5. With this embodiment, I have found that when switch S5 closes with the contact points terminating the anode leads H and H', generation of electrical alternating currents of a wide range of frequencies is obtainable; and that when switch S5 closes with the contact points terminating the anode leads shown in part by the lines DL and DL', with some overlapping, generation of electrical alternating currents of another wide range of frequencies becomes obtainable. I have also found that, with other things remaining unchanged, if the axis of the coil L'' is reversed, the generation with respect to frequencies automatically reverses; that is, where the range of frequencies first included of the order of 100 megacycles and far below, on the said reversal this range of frequency generation gave way to of the order of 100 megacycles and far above, and vice versa. Once it is known what to exepect, determination of which way to set up coil L'' to obtain the proper results is a very simple matter.

Thus, the results obtained after reversal of the axis of coil L'' compared to the results obtained before the said reversal, coupled with the results obtainable out of all of the other embodiments of my present invention, clearly prove that, irrespective of modified circuit details, unadulterated standard thermionic tubes having the proper numbers and arrangements of electrodes, properly handled, can be depended upon in connection with designing generators of electrical alternating currents meeting all of the frequency demands reasonably foreseeable at the present time by those interested in the particular art.

Fig. 8, as before disclosed, with the exception of certain modifications in the circuits and their elements involved substantially the same as those treated in connection with Fig. 7, is, in its embodiment, substantially the equivalent of Fig. 3. Including as it does in the thermionic tubes screen grids SG and SG' which, as in the case of Fig. 3, act to substantially cancel out the anode-to-grid capacitance effects inherent in the tubes of Fig. 7, the fact that it works fully as well as the embodiment of Fig. 7 proves beyond all doubt that the latter does not necessarily depend at all upon the inherent anode-to-grid capacitance that exists in each of its respective tubes for its satisfactory operation as a generator of electrical alternating currents described above.

Obviously, the coupling of coil L'' to inductance L in Figs. 7 and 8 automatically makes its reactions to the current flows involved an integral part of the reactions of circuit LC in determining the frequency control of the electrical alternating currents involved, which reactions will under all conditions be necessarily small due to the very high impedance of the grids across which is connected. Also, in all of the embodiments with respect to any work circuit associations with circuit LC, in the cases of the reactions involved they automatically become an integral part of the reactions of the circuit LC in determining the frequency control of the electrical alternating currents involved, which reactions will of course depend upon the respective loads taken by the respective work circuits.

Since duplex tubes have been successfully used by me with the modifications specifically embodied in Figs. 7 and 8, my failure to show the same in the drawings is not intended as a denial of their workability in connection with my present invention; and the same is true with respect to not showing with them a plurality of frequency control circuits with distinctions between coil and rod inductances. The same remarks also apply to my failure to apply the modifications involved to the 5-electrode tubes of Figs. 5 and 6.

While I have described my present invention in certain confined respects, it is apparent that modifications may be made, and that no limitations are intended other than those imposed by the scope of the appended claims.

What I claim as new and desire to secure by Letters Patent of the United States is as follows:

1. In a system for generating an electrical alternating current of an ultra high frequency: the combination of two substantially identical electron paths each having at least an electron source in spaced relation to an effective electron attracting positive potential anode and a negative potential control grid interposed therebetween in normal spaced relations thereto; a circuit comprising paralleled inductance and capacitance which with its associated reactions alone determines the frequency of generation; connectors from oppositely phased points of potential in said circuit to the respective ones of said anodes for simultaneously impressing oppositely phased alternating potentials developed in said circuit on said anodes; and electrostatically reactive connectors between said anodes and their respective companion control grids for simultaneously impressing potentials of the same alternating potentials on said respective companion control grids of said anodes; whereby said system will generate stable electrical alternating current only when the electrical natural period of said circuit corresponds to an ultra high frequency high enough to cause said system to overcome its inherent opposition to generating electrical alternating currents of lower frequencies.

2. The system of claim 1, in which the electrical natural period of the circuit comprising paralleled inductance and capacitance is variable over a substantial range of the ultra high frequencies in which it will generate electrical alternating currents.

3. The system of claim 1, in which, by suitable switching mechanism, the simultaneous impressing of potentials of the same alternating potentials on the respective companion control grids of the said anodes can be shifted to the respective non-companion control grids to thereby give it the power to generate electrical alternating current of lower frequency provided the electrical natural period of the circuit comprising paralleled inductance and capacitance is changed to correspond to the lower frequency involved.

4. The system of claim 1, in which coil form of inductance is replaced by rod form inductance.

5. The system of claim 1, in which the two electron paths are consolidated in a single envelope.

6. In a thermionic tube and circuit system for generating electrical alternating currents ranging in frequency from audible to ultra high or substantial fractions thereof with the same thermionic tubes or an equivalent duplex tube: the combination of two substantially identical thermionic tube electron paths each having at least an electron source in spaced relation to an effective electron attracting positive potential anode and a negative potential control grid interposed therebetween in normal spaced relations thereto; a terminated connection to each of said anodes; a set of variable-in-electrical-natural-periods paralleled inductance and capacitance circuits whose summed up total natural periods cover the entire range of frequencies desired, each having oppositely phased terminations arranged to contact with each of the respective terminated connections of said anodes on being selected therefor, which said natural periods substantially alone respectively determine the frequencies of generation; terminated connections to each of said control grids associated with a suitable switching mechanism; and connections to said switching mechanism; whereby oppositely phased alternating potentials developed in any one of said circuits when in use are so distributed through said switching mechanism to the respective control grids that through proper use of the same the generation of electrical alternating currents can be maintained throughout the sum total frequency range of the said circuits.

7. In a system for generating electrical alternating current of an ultra high frequency: the combination of two substantially identical electron paths each having at least an electron source in spaced relation to an effective electron attracting positive anode and a negative potential control grid interposed therebetween in normal spaced relations thereto; a terminated connection to each of said anodes; and a paralleled inductance and capacitance circuit having an electrical natural period corresponding to the ultra high frequency desired, which natural period substantially alone determines the frequency of generation, said circuit having oppositely phased terminations coupled to the terminations of the connections to said anodes and two substantially-equal-in-value capacitances, one connected between one of said anodes and its companion control grid and the other connected between the other one of said anodes and its companion control grid; whereby the system will generate an electrical alternating current of the ultra high frequency desired provided the frequency to which the electrical natural period of said circuit corresponds is high enough.

8. In a thermionic tube and circuit system for generating electrical alternating currents ranging in frequency from audible to ultra high or substantial fractions thereof with the same thermionic tubes or an equivalent duplex tube: the combination of two substantially identical thermionic tube electron paths each having at least an electron source in spaced relation to an effective electron attracting positive potential anode and a negative potential control grid interposed therebetween in normal spaced relations thereto; a terminated connection to each of said anodes; a set of variable-in-electrical-natural-periods parallel inductance and capacitance circuits whose summed up total electrical natural periods cover the entire range of frequencies desired, each having oppositely phased terminations arranged on selection to contact with the respective terminated anode connections, which natural periods substantially alone respectively determine the frequencies of generation; and two substantially equal in value capacitances, arranged through a switching mechanism to be interposed first, one between each of said anodes and its companion control grid, and, second, one between each of said anodes and its non-companion control grid; whereby oppositely phased alternating potentials developed in any one of said circuits when in use are so distributed through said switching mechanism to said control grids that through proper use of the same the generation of electrical alternating currents can be maintained throughout the sum total frequency range of said set of circuits.

9. The system of claim 1, in which a positive potential screening electrode is interposed between anode and control grid in each of the electron paths.

10. The system of claim 6, in which a positive potential screening electrode is interposed between anode and control grid in each of the electron paths.

11. The system of claim 7, in which a positive potential screening electrode is interposed between anode and control grid in each of the electron paths.

12. The system of claim 8, in which a positive potential screening electrode is interposed between anode and control grid in each of the electron paths.

13. The system of claim 1, in which a positive potential screening electrode and a grid having a potential equaling the potential of the electron source are interposed between the negative potential control grid and the anode in the order named.

14. The system of claim 6, in which a positive potential screening electrode and a grid having a potential equaling the potential of the electron source are interposed between the negative potential control grid and the anode in the order named.

15. The system of claim 7, in which a positive potential screening electrode and a grid having a potential equaling the potential of the electron source are interposed between the negative potential control grid and the anode in the order named.

16. The system of claim 8, in which a positive potential screening electrode and a grid having a potential equaling the potential of the electron source are interposed between the negative potential control grid and the anode in the order named.

17. In a system for generating and modulating an electrical alternating current: the combination of two substantially identical electron paths each having a source of electrons in spaced relation to an effective electron attracting positive potential anode plus two negative potential control grids interposed therebetween and a positive potential screening grid interposed between said control grids; a paralleled inductance and capacitance circuit having oppositely phased terminations coupled to said anodes whereby oppositely phased alternating potentials developed in said circuit are simultaneously impressed upon said anodes; which said circuit with its associated reactions alone determines the frequency of generation; electrostatically reactive connectors including alternatively selective switching means between said anodes and said control grids adjacent to their companion electron sources for simultaneously impressing potentials of the same alternating potentials upon the adjacent-to-said-electron-sources companion control grids of said anodes and switching the same to the adjacent-to-said-electron-sources non-companion control grids of said anodes when desired; and a source of modulating current plus connections from the same to the respective control grids adjacent to said anodes.

18. In a system for generating and modulating an electrical alternating current of an ultra high frequency: the combination of two substantially identical electron paths each having an electron source in spaced relation to an effective electron attracting positive potential anode plus two negative potential control grids interposed therebetween and a positive potential screening electrode interposed between said control grids; a paralleled inductance and capacitance circuit having oppositely phased terminations coupled to said anodes whereby oppositely phased alternating potentials developed in said circuit are simultaneously impressed upon the respective ones of said anodes, which said circuit with its associated reactions alone determines the frequency of generation; electrostatically reactive connectors from said anodes to their respective companion control grids adjacent to their companion electron sources for simultaneously impressing potentials of the same alternating potentials upon said companion control grids of said anodes, whereby said system will generate electrical alternating current only when the electrical natural period of said circuit corresponds to an ultra high frequency high enough to cause said system to overcome its inherent opposition to generating electrical alternating currents of lower frequencies; and a source of modulating current plus connections from the same to the respective control grids adjacent to the respective anodes.

19. In a system for generating and volume controlling electrical alternating currents: the combination of two substantially identical electron paths each having a source of electrons in spaced relation to an effective electron attracting positive potential anode plus two negative potential control grids interposed therebetween and a positive potential screening grid interposed between the said control grids; a paralleled inductance and capacitance circuit having oppositely phased terminations coupled to respective ones of said anodes whereby oppositely phased alternating potentials developed in said circuit are simultaneously impressed upon the respective ones of said anodes, which said circuit with its associated reactions alone determines the frequency of generation; electrostatically reactive connectors including alternatively selective switching means between said anodes and said companion control grids adjacent to their companion electron sources for simultaneously impressing potentials of the same alternating potentials the adjacent-to-said-electron-sources companion control grids of said anodes and switching the same to the adjacent-to-said-electron-sources non-companion control grids of said anodes when desired; and a source of volume-controlling current plus connections from the same to the respective control grids adjacent to said anodes.

20. In a system for generating and volume controlling electrical alternating current having an ultra high frequency: the combination of two substantially identical electron paths each having an electron source in spaced relation to an effective electron attracting positive potential anode plus two negative potential control grids interposed therebtween and a positive potential screening electrode interposed between said control grids; a paralleled inductance and capacitance circuit having oppositely phased terminations coupled to respective ones of said anodes whereby oppositely phased alternating potentials developed in said circuit are simultaneously impressed upon the respective ones of said anodes; which said circuit with its associated reactions alone determines the frequency of generation; electrostatically reactive connectors from said anodes to their respective companion control grids adjacent to their companion electron sources for simultaneously impressing respective potentials of the same alternating potentials upon the respective companion control grids of the respective ones of said anodes adjacent the respective electron sources; whereby said system will generate electrical alternating current only when the electrical natural period of said circuit corresponds to an ultra high frequency high enough to cause said system to overcome its inherent opposition to generating electrical alternating currents of lower frequencies; and a source of volume controlling current plus connections from the same to the respective control grids adjacent said anodes.

21. In a system for generating high frequency electrical alternating currents: the combination of two substantially identical electron paths each having an electron source in spaced relation to an effective electron attracting positive potential anode plus two control grids interposed therebetween and a positive potential screening electrode interposed between said control grids; a source of negative potential for making each of said control grids nearer its said electron source negative to substantially the same extent; a source of direct current voltage for simultaneously impressing upon the other ones of said control grids any chosen degree and polarity of electrical direct current potential; a source of electrical alternating current for impressing upon said last named control grids any degree and frequency of electrical alternating current potential; a circuit connected between said anodes including inductance and capacitance adapted to be tunable through a substantial range of high frequencies and substantially equal-in-value capacitances connected between each of said anodes and each of the corresponding control grids nearer their respective electron sources, which said circuit with its associated reactions alone determines the frequency of generation; the circuits between the grids nearer electron sources and the said sources per se containing no more than necessary to establish a like direct current potential on each of said grids.

22. In a system for generating electrical alternating currents having two electron paths and associated circuits which system is made capable of generating such currents at ultra high frequencies solely by a novel arrangement in said circuits: the combination of two substantially identical electron paths each having at least an electron source in normal spaced relation to an effective electron attracting positive potential anode and a negative potential control grid interposed therebetween in normal spaced relations thereto; a terminated connection to each of said anodes; a paralleled inductance and capacitance circuit having an electrical natural period corresponding to the ultra high frequency desired and oppositely phased terminations coupled to respective ones of said anode terminations, which said natural period substantially alone determines the frequency of generation; and two substantially-equal-in-value capacitances, one connected between one of said anodes and its companion control grid and the other connected between the other one of said anodes and its companion control grid; whereby said system will generate an electrical alternating current of the ultra high frequency desired if the frequency to which the electrical natural period of said circuit corresponds is high enough therefor.

23. The system of claim 22, in which the two electron paths are consolidated in a single envelope.

24. The system of claim 22, in which a positive potential screening electrode is interposed between control grid and anode in each electron path.

25. The system of claim 22, in which a rod form of inductance may be employed.

26. The system of claim 22, in which the circuit comprising paralleled inductance and capacitance has said capacitance variable enough to make said system's generation of electrical alternating currents variable over a substantial range of ultra high frequencies.

27. The system of claim 22, in which a suitable-for-the-purpose switching mechanism associated with the two substantially-equal-in-value capacitances provides for switching the respective anode connections to the respective companion control grids over to the respective non-companion control grids to thereby adapt said system for generating electrical alternating currents of otherwise-not-generatable-with-said-system lower frequency provided the electrical natural period of the inductance-capacitance circuit is changed to correspond to the lower frequency involved.

28. The system of claim 22, in which a positive potential screening electrode and a grid having a potential substantially equaling the potential of the electron source are interposed in the order named between the negative potential control grid and the anode in each electron path.

29. The system of claim 22, in which a positive potential screening electrode and a negative potential control grid are interposed in the order named between the control grid and anode in each electron path and a source of electrical alternating current is connected between said negative potential control grids nearer to said anodes and the electron sources of said electron paths.

30. The system of claim 22, in which a positive potential screening electrode and a negative potential control grid are interposed in the order named between the control grid and anode in each electron path and a source of electrical alternating current is connected between said negative potential control grids nearer said anodes and the electron sources of said electron paths, the negative potential of said control grids nearer to said anodes being substantially enough to exceed the potentials of the positive half cycles of said alternating current.

31. The system of claim 22, in which a positive potential screening electrode and a negative potential control grid are interposed in the order named between the control grid and the anode in each electron path and a source of unidirectional volume-controlling potential is connected between said negative potential control grids nearer to said anodes and the electron sources of said electron paths.

32. In a system having two electron paths and associated circuits for generating electrical alternating currents ranging in frequency from audible to ultra high or substantial fractions thereof with the same electron paths, which system is made capable of generating such currents at ultra high frequencies solely by a novel arrangement applied to said circuits: the combination of two substantially identical electron paths each having at least an electron source in normal spaced relation to an effective electron-attracting positive potential anode and a negative potential control grid interposed therebetween in normal spaced relations thereto; a terminated connection to each of said anodes; a set of variable-in-electrical-natural-periods paralleled inductance and capacitance circuits whose summed up total natural periods cover the entire range of frequencies desired, each having oppositely phased terminations arranged to respectively contact with each of the respective terminated connections of said anodes on being selected therefor, which said natural periods substantially alone respectively determine the frequencies of generation; terminated connections to each of said control grids associated with a suitable-for-the-purpose switching mechanism; and connections to said switching mechanism from said circuit terminations containing substantially-equal-in-value capacitances; whereby oppositely phased alternating potentials developed in any one of said circuits put to use are so distributed through said switching mechanism to the respective control grids that through proper use of said circuits and switching mechanism the generation of electrical alternating currents at frequencies throughout the sum total frequency range of said circuits can be carried out.

33. The system of claim 32, in which the two electron paths are consolidated in a single envelope.

34. The system of claim 32, in which a positive potential screening electrode is interposed between the control grid and the anode in each electron path.

35. The system of claim 32, in which rod form inductance is employable.

36. The system of claim 32, in which a positive potential screening electrode and a grid having a potential substantially equaling the potential of the electron source are interposed in the order named between the negative potential control grid and anode in each electron path.

37. The system of claim 32, in which a positive potential screening electrode and a negative potential control grid are interposed in the order named between control grid and anode in each electron path and a source of electrical alternating current is connected between said negative potential control grids nearer to said anodes and the electron sources of said electron paths.

38. The system of claim 32, in which a positive potential screening electrode and a negative potential control grid are interposed in the order named between the control grid and the anode in each electron path and a source of electrical alternating current is connected between said negative potential control grids nearer to said anodes and the electron sources of said electron paths, the negative potential of the last-named control grids being substantially enough to exceed the potentials of the positive half cycles of said alternating currents.

39. The system of claim 32, in which a positive potential screening electrode and a negative potential control grid are interposed in the order named between the control grid and the anode in each electron path and a source of unidirectional volume controlling potential is connected between said negative potential control grids nearer to said anodes and the electron sources of said electron paths.

40. In a system for generating electrical alternating currents at ultra-high frequencies, the combination of means providing two substantially identical electron paths each having at least an electron source, an electron-attracting anode and a control grid interposed therebetween in normal spaced relation thereto, a resonant circuit having an electrical natural period corresponding to the ultra-high frequency desired to be generated, said natural period substantially alone determining the frequency of generation, said circuit being coupled in oppositely phased relation to said two anodes, and means coupling said circuit in oppositely phased relation to said control grids to excite each control grid from said circuit cophasally with its corresponding anode, whereby said system will generate an alternating current of the desired ultra-high frequency if the frequency to which the natural period of said circuit corresponds is high enough therefor.

SURRIUS RECTOR MONTCALM.

REFERENCES CITED

The following references are of record in the file of this patent:

UNITED STATES PATENTS

| Number | Name | Date |
|---|---|---|
| 1,754,749 | Gerth | Apr. 15, 1930 |
| 1,775,327 | Simpson | Sept. 9, 1930 |
| 1,830,642 | Crossley | Nov. 3, 1931 |
| 1,986,623 | Conklin | Jan. 1, 1935 |
| 2,047,622 | Evans | July 14, 1936 |
| 2,068,324 | Heising | Jan. 19, 1937 |
| 2,105,749 | McClelland | Jan. 18, 1938 |
| 2,121,158 | Lindenblad | June 21, 1938 |
| 2,153,778 | Travis | Apr. 11, 1939 |
| 2,192,306 | Graffunder | Mar. 5, 1940 |
| 2,297,926 | Usselmann | Oct. 6, 1942 |

FOREIGN PATENTS

| Number | Country | Date |
|---|---|---|
| 722,386 | France | Dec. 29, 1931 |